US007634934B2

(12) United States Patent
Krintzline et al.

(10) Patent No.: US 7,634,934 B2
(45) Date of Patent: Dec. 22, 2009

(54) FORGED ROLLER

(75) Inventors: Donald E. Krintzline, Tiffin, OH (US);
Mark W. Bordner, Attica, OH (US)

(73) Assignee: National Machinery LLC, Tiffin, OH (US)

( * ) Notice: Subject to any disclaimer, the term of this patent is extended or adjusted under 35 U.S.C. 154(b) by 0 days.

(21) Appl. No.: 12/123,488

(22) Filed: May 20, 2008

(65) Prior Publication Data
US 2008/0216550 A1 Sep. 11, 2008

Related U.S. Application Data

(62) Division of application No. 10/890,339, filed on Jul. 13, 2004, now Pat. No. 7,377,042.

(51) Int. Cl.
*B21D 22/00* (2006.01)
(52) U.S. Cl. .................. 72/353.2; 72/354.8
(58) Field of Classification Search ............. 72/353.2, 72/354.2, 354.6, 354.8, 355.2, 355.4, 355.6, 72/357, 356, 377; 492/27, 28; 29/895.3, 29/895.33
See application file for complete search history.

(56) References Cited

U.S. PATENT DOCUMENTS

| 585,821 | A | * | 7/1897 | Kent ........................ 72/355.4 |
| 1,205,796 | A | * | 11/1916 | Schlumpf .................. 72/353.2 |
| 1,601,252 | A | | 9/1926 | Lines |
| 1,640,964 | A | * | 8/1927 | Schlaupitz et al. .......... 72/353.2 |
| 2,603,987 | A | * | 7/1952 | Lyon ......................... 72/353.2 |
| 3,759,080 | A | * | 9/1973 | Sugahara et al. ............. 72/356 |
| 3,791,188 | A | * | 2/1974 | Deussen ..................... 72/356 |
| 3,842,646 | A | * | 10/1974 | Kuhn ....................... 72/354.8 |
| 4,590,782 | A | * | 5/1986 | Leykamm et al. .......... 72/354.8 |
| 4,649,731 | A | * | 3/1987 | Eisenmann ................. 72/352 |
| 5,678,439 | A | * | 10/1997 | Dunwoody et al. ............ 72/45 |
| 5,746,085 | A | * | 5/1998 | Harada et al. ............. 72/355.6 |
| 6,440,237 | B1 | | 8/2002 | Skilling et al. |
| 6,457,341 | B1 | * | 10/2002 | Wirgarth .................... 72/354.2 |

FOREIGN PATENT DOCUMENTS

DE 122651 10/1976

OTHER PUBLICATIONS

Notification of Transmittal of the International Search Report and The Written Opinion of the International Searching Authority, or the Declaration, dated Aug. 22, 2008, received in PCT/US05/24637, filed Jul. 12, 2005.

* cited by examiner

*Primary Examiner*—Edward Tolan
(74) *Attorney, Agent, or Firm*—Pearne & Gordon LLP

(57) ABSTRACT

A machine, method and tooling to precision cold-form roller blanks for anti-friction bearings. The machine is a multistage progressive former using floating die cavities to enable simultaneous shaping of the ends of the roller with high accuracy and without flash. The tools and staged forming create an improved roller with an advantageous grain pattern and devoid of structural defects previously attributable to the presence of sheared end face material in the radiused corners of the blank and flash at its mid-section.

15 Claims, 5 Drawing Sheets

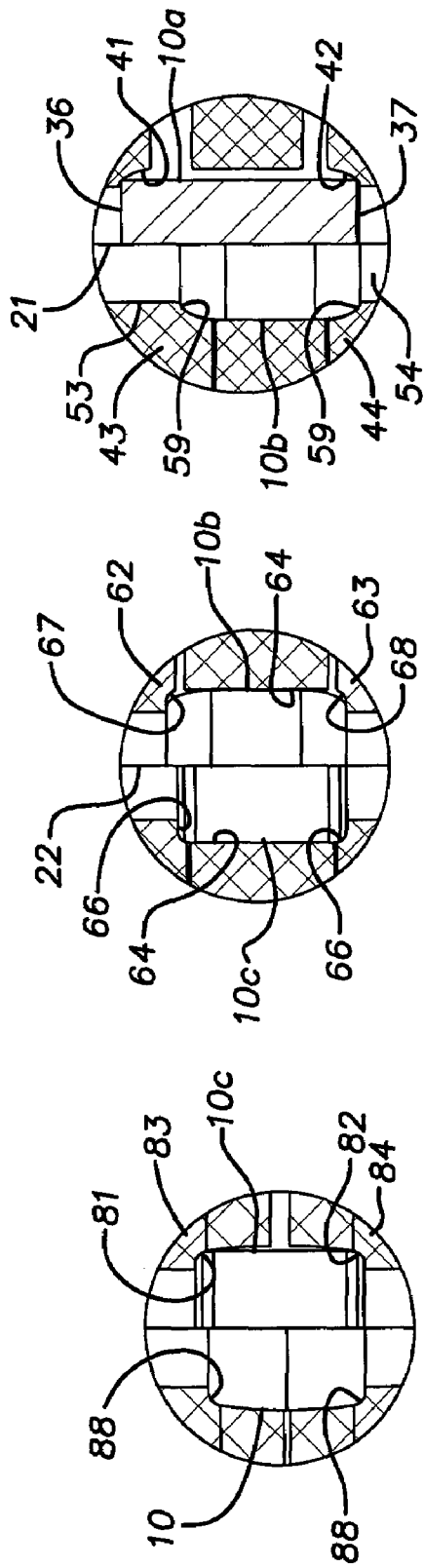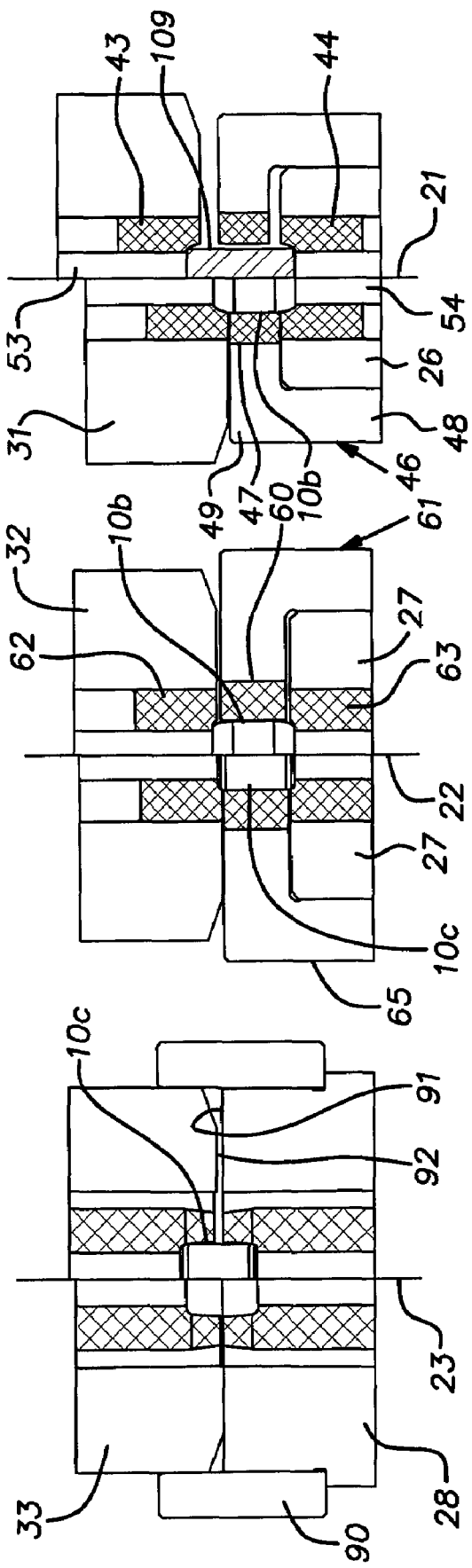

FORGED ROLLER

This application is a divisional of application Ser. No. 10/890,339 filed Jul. 13, 2004, now U.S. Pat. No. 7,377,042.

BACKGROUND OF THE INVENTION

The invention relates to the manufacture of cold-formed rollers and, in particular, to a process, machine and tooling that affords improvements in roller quality and reduction in manufacturing costs.

PRIOR ART

Rollers used in anti-friction bearings are commonly initially made in cold-forming machines. Traditionally, the cold-formed pieces are subsequently machined by grinding processes to achieve a desired precision shape and finish. Typically, grinding operations may involve several steps because the cold-formed part has significant flash and/or excess material as a result of the limitations and characteristics of traditional methods and tooling used in the cold-forming art. Grinding processes are expensive and significantly add to the cost of the finished roller.

SUMMARY OF THE INVENTION

The invention involves a cold-formed metal roller blank, that is relatively close to the net shape of a finish ground roller thereby greatly reducing machining or grinding costs and that has an improved grain structure which avoids premature bearing failure. The improved cold-formed part results from tooling elements that closely shape a part without flash and with a grain structure that follows the contours of the end edges of the roller and is axially uninterrupted thereby avoiding irregularities in the finished machined product.

The process involves multistage forming steps and unique tooling capable of producing accurate shapes at each station without the need or risk of flash. The tooling is configured to work a blank that is relatively small in diameter compared to prior art practice, into a part of substantially increased diameter. This technique assures that the material of the sheared end faces of the original blank are essentially excluded from the formed radiused corners between the zone of the rolling surface of the roller and the end faces of the roller.

The roller blank or workpiece is simultaneously formed at each end, at each station. The annular radiused corners at the ends of the workpiece are progressively accurately formed by filling the corresponding tool and die cavity areas at successive workstations without creating or risking flash at separation planes between the tool and die cavity parts. This flashless forming is accomplished by confining and shaping the mid-length of the blank with a floating die ring that eliminates the effects of friction at the sides of the workpiece which otherwise would inhibit material flow into the cavity corners and promote or require unwanted flash. At the last station, the workpiece is precision formed by closing the tool and die with a positive stop so that the tool geometry determines the final part shape independently of machine variables.

BRIEF DESCRIPTION OF THE DRAWINGS

FIGS. 4A and 4B are schematic sectional views of the first station of the machine of FIG. 3 before and at front dead center of the slide, respectively;

FIGS. 5A and 5B are schematic sectional views of the second station of the machine of FIG. 3 before and at front dead center of the slide, respectively;

FIGS. 6A and 6B are schematic sectional views of the third station of the machine of FIG. 3 before and at front dead center of the slide, respectively.

DESCRIPTION OF THE PREFERRED EMBODIMENT

Figure 1:
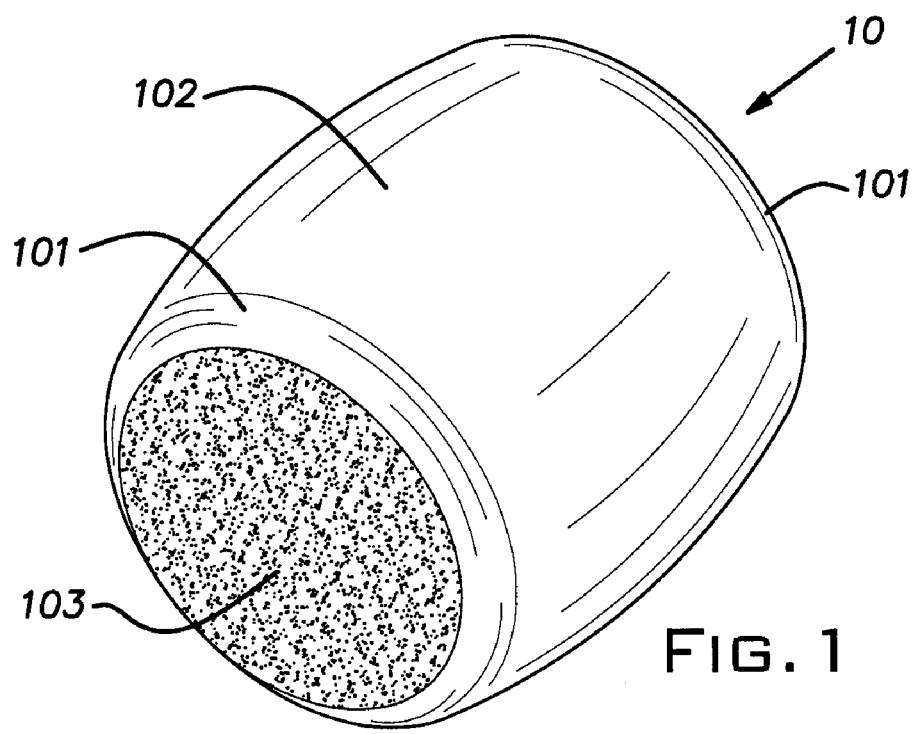
FIG. 1 is a perspective view of a roller blank made in accordance with the invention.

FIG. 1 illustrates an example of a cold-formed roller blank 10 made in accordance with the present invention. The roller blank is of the barrel type, but it will be appreciated that certain principles of the invention are applicable to other roller styles including cylindrical and tapered rollers. The roller blank 10 made by the processes and tools disclosed hereinbelow can be produced to dimensional tolerances that are reduced to about 1/10 of that which is presently commercially accepted for subsequent finishing, typically by grinding after heat treatment. The roller blank 10 after heat treating and grinding is typically used with multiple identical pieces in anti-friction bearing assemblies as known in the art.

Figure 3:
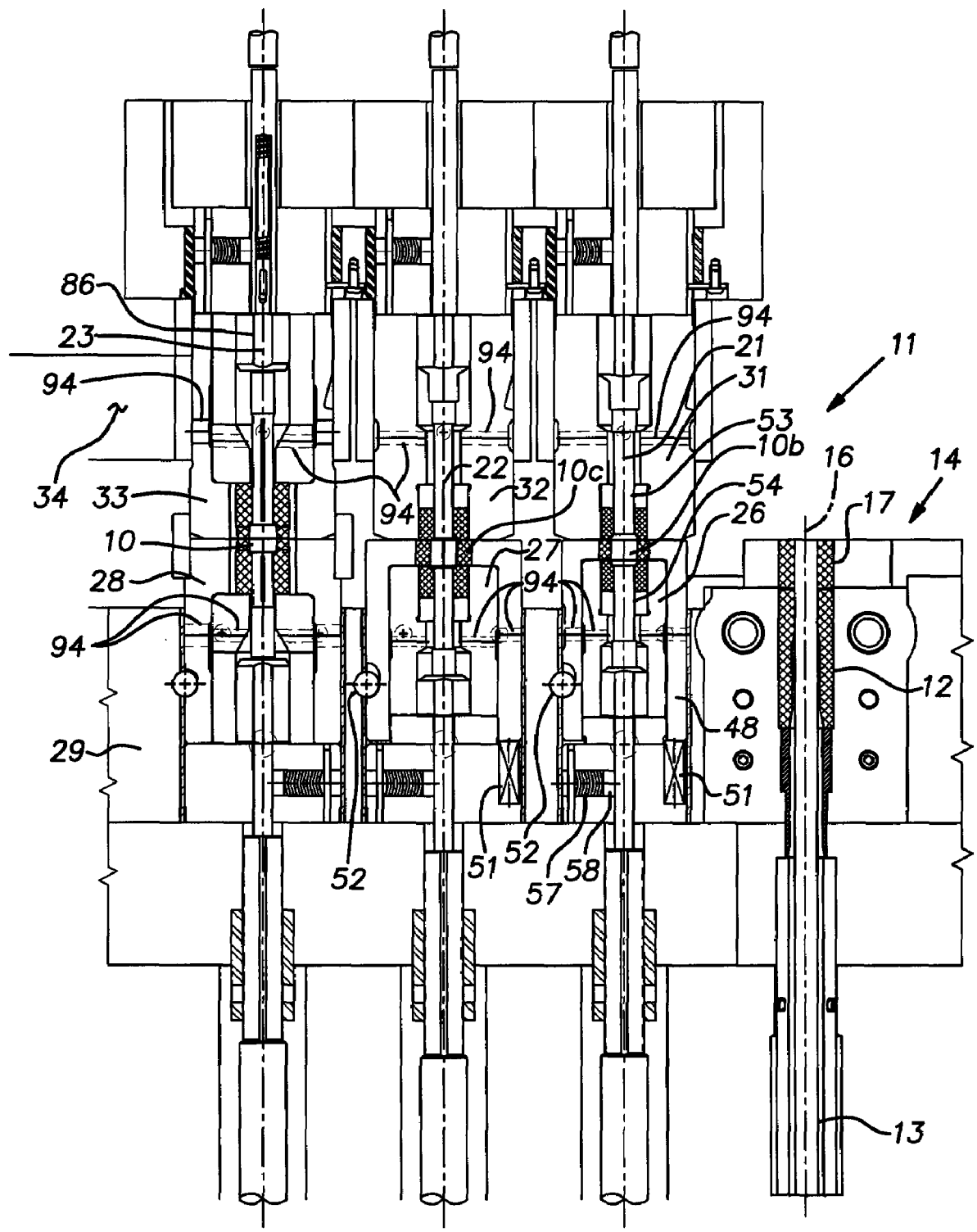
FIG. 3 is a somewhat schematic plan view of tooling area of a multistation cold-forming or forging machine arranged to perform the process of the invention.

The roller 10 is formed in a multistation progressive cold-forming machine 11 illustrated in FIG. 3 and of a type generally known in the industry. The forging machine 11 is depicted in a plan view of the tooling area in FIG. 3. The machine 11 includes a quill 12 that receives steel wire 13 at a cutoff station 14, the center of which is represented by the center line 16. The wire 13, which is of a suitable steel such as AISI 52100, is very precisely fed in increments corresponding to the desired length of an initial workpiece or blank 10a to a shear or cutter 17 by feed apparatus known in the art. The machine 11 includes multiple progressive forming stations 21-23, preferably three in number. The stations 21-23 are conventionally uniformly spaced from one another and from the cutoff station 14. The forming stations 21-23 include die cases 26-28 fixed on a stationary die breast or bolster 29 and tool or punch cases 31-33 on a slide 34 that reciprocates towards and away from the die breast 29. The slide 34 is shown at front dead center in FIG. 3. A conventional transfer mechanism, not shown, moves workpieces in steps from the cutoff station 14 to each of the forming stations 21-23 in timed relation to cyclical displacement of the slide 34 to and from the die breast 29.

The following description of the formation of roller blanks 10 is made with reference to FIGS. 3, 4A, B, 5A, B, and 6A, B. The initial blank or workpiece 10a of predetermined diameter and precise length is produced by the shear 17 such that each end face 36, 37 of the blank 10a is a sheared surface having irregularities or unevenness inherent in the shearing process. The workpiece 10a is transferred to the first forming station 21 represented in FIGS. 4A and 4B. Tool and die cavities 41, 42 are formed in respective inserts 43, 44. These inserts or tooling elements 43, 44 and others shown in FIGS. 3 and 4 with cross-hatching are formed of carbide or other suitable tooling material. Associated with the die cavity 42 is a floating die ring 46 including an insert 47. These cavities 41, 42, inserts 43, 44, die ring 46, and insert 47, as well as others to be described, are annular or ring-like in form. As shown in FIG. 3, the floating die ring 46 is a cup-shaped body with a deep cylindrical skirt 48 and an integral end wall 49. As indicated in FIG. 3, the floating die ring skirt 48 is telescoped over the die case 26 with minimal radial clearance between these elements, while allowing axial movement between them. The end wall 49 has a central aperture in which the die ring insert 47 is fixed.

The floating die ring 46 is resiliently biased to a forward position where its end wall 49 and insert 47 is spaced a limited distance from the die cavity 42 and the case 26 (as indicated in the right side of FIGS. 4A and 4B). The biasing force is provided by compression springs 51 (only one is seen in the plane of FIG. 3) distributed symmetrically about the axis of the die cavity 42 (corresponding to the center line of the first station 21). The forward or extended position of the floating die ring 46 is determined by a tangential pin 52 received in a slot on the periphery of the floating die ring skirt 48.

Referring to FIGS. 4A and 4B, a workpiece or initial blank 10a is received in the first station 21. The right side of FIGS. 4A and 4B illustrate the beginning of the forming stages on the blank 10a which has been transferred from the cutoff station 14. Prior to the instant in the machine cycle depicted at the right side of FIGS. 4A and 4B, the blank has been held in position at this station by its ends 36, 37 with knockout or ejector pins 53, 54, associated with the tool and die elements, respectively. These pins 53, 54 are yieldably held in their extended positions from the preceding machine cycle by friction drags, comprising belleville springs 57 and a friction shoe 58 thereby enabling the pins to grip the blank 18 when it is received from the transfer mechanism. Similar friction drags on the knockout pins at the subsequent stations 22, 23 are provided for the same purpose. In the illustrated arrangement, the tool and die cavities 41, 42 have blank radiused corner forming areas 59 with minimum diameters that in the illustrated example are smaller than the original diameter of the workpiece 10a. The left sides of FIGS. 4A and 4B correspond to front dead center of the slide 34 and illustrate completion of the shaping of the workpiece at the first station. In the illustrated process, the workpiece or blank 10b has been partially extruded simultaneously and symmetrically at both of its ends and has been upset at its mid-section. The extrusion component of the forming process at this first station 21 results in substantially all of the material forming the original sheared end face 36, 37 to be displaced from the annular radiused corners 59 of the insert cavities 41, 42 which shape the rounded or radiused corners of the blank 10b between the ends of the blank and the sides of the blank. As shown, the radiused corners of the blank are produced by the complimentary-shaped corners 59 of the tool and die cavities 41, 42.

The floating die ring 46 enables the material of the blank 10b to be fully driven into the corners 59 of the die cavity 42. When the mid-length section of the blank 10b upsets, it is constrained to a desired size by the floating die ring 46, and specifically the cylindrical interior surface of the insert 47. Friction between the blank 10a and the wall of the floating ring insert 47 cannot significantly restrict displacement of blank material into the die cavity corners 59 because the floating ring 46, by overcoming a relatively small force of the biasing springs 51, can move with the blank stock and with the advancing tool cavity 41 so that substantially the full forging force is transmitted to the blank material in the area of the die cavity corners 59. Thus, the effect of sidewall friction in the forming cavities of the die side of the tooling is effectively eliminated and the ends of the blank 10b can be formed symmetrically end-to-end essentially simultaneously.

The second die station 22, represented at FIGS. 5A, 5B, includes a floating die ring 61 similar in construction and function to the die ring 46 of the first station 21 and floating ring insert 60. Associated with the floating die ring 61 are an integral cylindrical skirt 65, springs 51 and a tangential pin 52 serving the same function as described before. Tool and die cavity inserts 62, 63 are mounted in respective cases 32 and 27.

The first station die ring insert 47 establishes a diameter on the mid-length of the blank 10b (left side of FIGS. 4A and 4B) that is relatively close, e.g. a slip fit or a clearance fit, to the diameter of the internal cylindrical surface of the floating die ring insert 60 at the second station. The blank or workpiece 10b is transferred to the second station 22 and because its diameter is close to the diameter of the inside wall of the insert 60, good alignment is maintained between the blank and tool elements of the second station 22. At this station, the next blow of the slide 34 causes the blank 10b to upset near its ends to reduce the radius of its corners and to expand its diameter near these corners. The floating die ring 61, as in the first station 21, eliminates the effects of friction between the mid-section of the blank and the die cavity 64 of the floating ring insert 60 so that the blank 10b can be fully upset into the corners 66 of the tool and die cavities 67, 68 of inserts 62, 63 symmetrically, end-for-end and simultaneously.

At the third station 23, seen in FIGS. 6A, 6B, symmetrical cavities 81, 82 are formed in tool and die insert sets 83, 84 mounted in the respective tool and die cases 33, 28. The right half of FIGS. 6A and 6B shows the start of the forming process and the left half of these figures shows the completed roller blank 10 developed at the end of the cold forming process. At this station 23, as can be seen in a comparison of the right and left halves of FIGS. 6A and 6B, the blank is formed by a combination of limited extrusion at its ends and upsetting along its mid-length. The shaping of the ends from the intermediate blank 10b received from the second station is somewhat limited but quite accurate. Upsetting of the mid-section of the blank 10 produces a final barrel shape.

The roller blank 10 produced at the third station 23 is very accurately formed for several reasons beyond the initial forming of its rounded corners as described in connection with the forming action at the first and second stations 21, 22. First, radiused corners 88 of the tool and die cavities 81, 82 are not substantially different than those existing at the prior second station 22 so that relatively little shaping is required in these corner areas at this station. Secondly, a guide ring 90 fixed on the die case 28 is very closely fitted to the lead end of the tool case 33 so that when the tool case is received in the ring, both of these tool and die cases are precision aligned with one another. The guide ring 90 and lead end of the case 28 are cylindrical.

The relative lengths of the tool and die cases 33, 28 is made so that there is a slight interference between them in the direction of slide movement when the slide is at front dead center and faces 91, 92 of the die and tool cases are in contact. In this manner, the final shape of the roller blank 10 is accurately and repeatedly determined by the shape of the tooling, i.e. the cavities 81, 82 of the inserts 83, 84. The tool insert 83, at least, is recessed slightly from the plane of the tool case 33 so that there is no contact between the tool and die inserts 83, 84 in the front dead center position of the slide.

The accuracy of the cold-forming machine 10 in making the roller blanks is augmented by the technique of cooling the tooling with lubricant/coolant. Lubricant/coolant is circulated with a pump (not shown) through internal passages 94 in the tool and die cases 31-33, 26-28, and floating die ring skirts 48, 65. The coolant can be arranged to keep the temperature of the tools between room temperature and 140° F. The method of cooling the tooling elements improves the forming accuracy of the cold-forming machine because it essentially eliminates thermally induced dimensional variations in the tooling which can otherwise result in variations in the dimensional accuracy of the roller blank parts it is making.

Comparing the configuration of the original blank 10a with the finished shape 10, it will be seen that the disclosed process departs from conventional practice in that a relatively large percentage of upset, i.e. change in diameter, is performed on the blank. This technique is helpful in removing irregularities out of the rounded or radiused corners of the blank 10.

Figure 2:
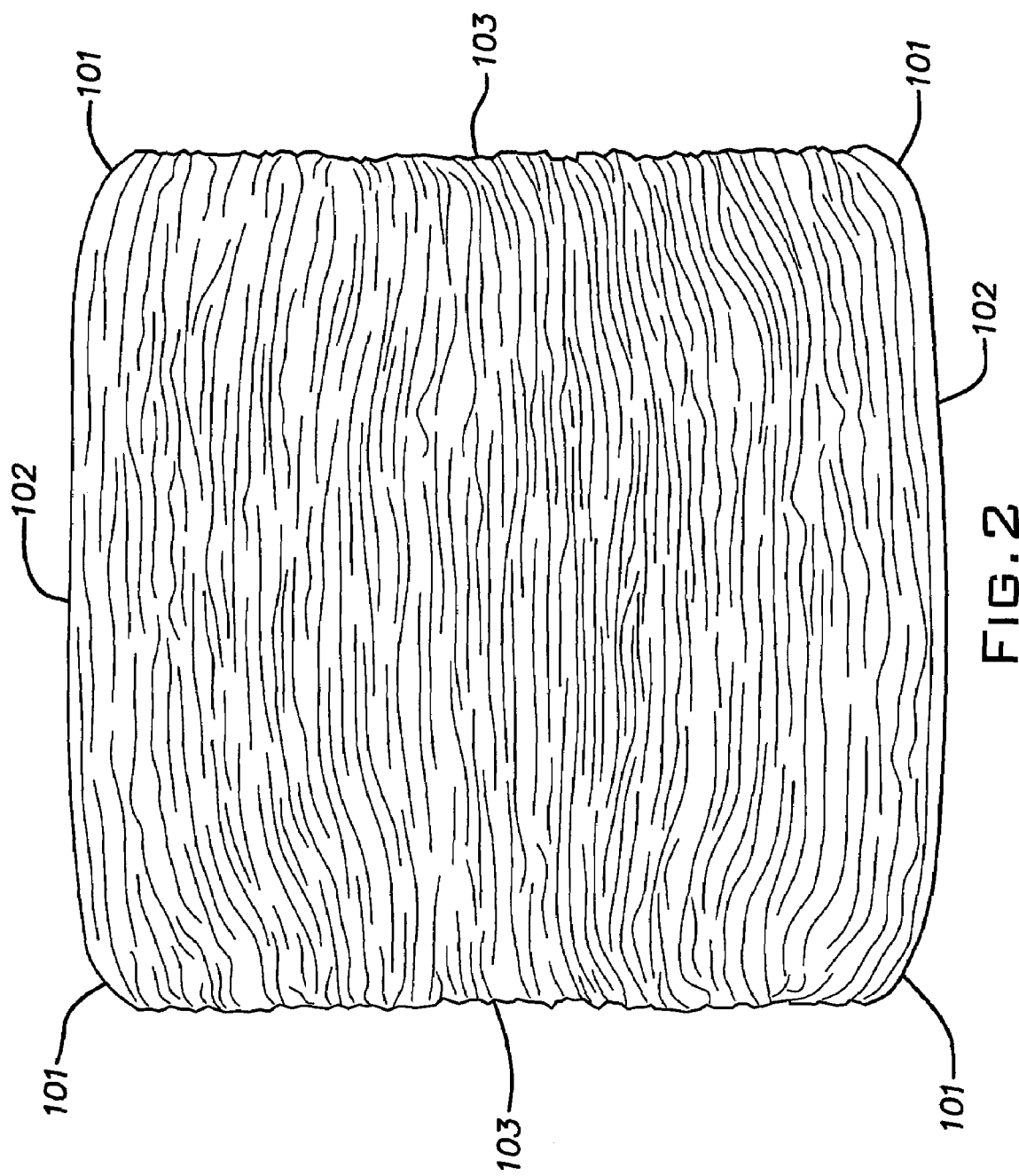
FIG. 2 is a photomicrograph of an axial cross-section of the blank of FIG. 1, acid etched to illustrate the grain pattern of the roller blank material.
Figure 2A:
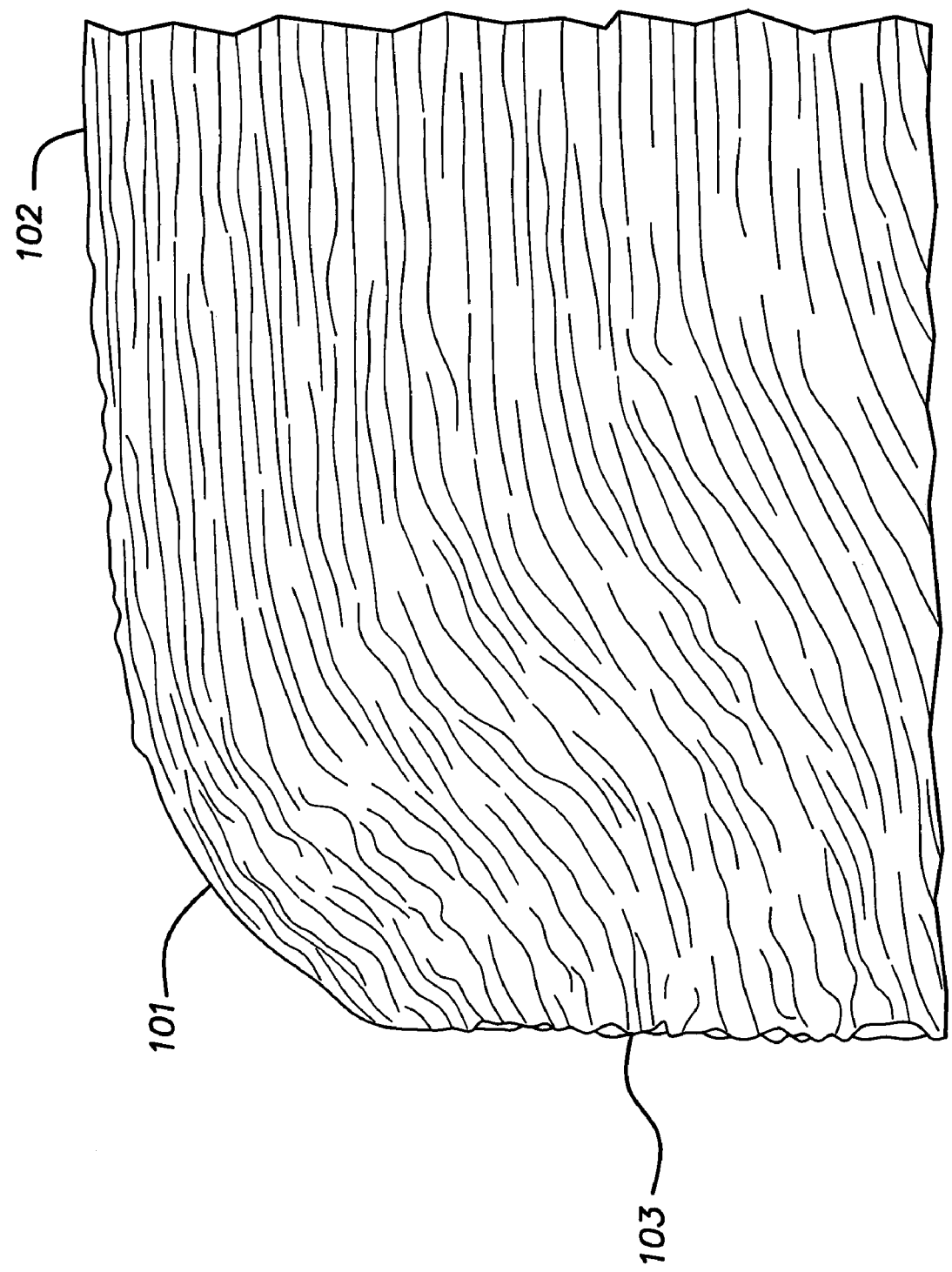
FIG. 2A is a photomicrograph similar to FIG. 2 of the blank cross-section on an enlarged scale of a typical radiused corner of the blank.

FIGS. 2 and 2a are photomicrographs of a longitudinally sectioned roller blank made according to the process and with the tooling and machine described hereinabove. The roller blank 10 has been etched to highlight its grain structure pattern. FIG. 2A is a view similar to FIG. 2 on an enlarged scale showing the grain structure pattern of the roller blank 10 at a radiused corner surface 101 between the peripheral main surface 102 corresponding to the rolling surface and an end surface 103 of the roller 10, the illustrated corner being typical of the other corners. In the illustrated example of the roller blank 10 particularly shown in FIG. 2A, the radiused corner surface 101 blends smoothly with the main surface 102. The grain pattern is characterized by smooth, uninterrupted lines that are parallel to the main surface 102 that extends along the major length of the roller blank and parallel to the annular radiused corner surfaces 101 at each end of the roller blank. The end faces 103 of the roller blank are generally perpendicular to its longitudinal axis which corresponds to the axis of rotation. The end faces 103, on the scale of FIGS. 2 and 2A are somewhat irregular since they are the vestiges of the sheared end faces of the original or starting form of the roller blank.

The roller blank 10 is superior to prior art roller blanks for several reasons. The roller blank is manufactured to very precise dimensional tolerances, in some cases in the order of ¹⁄₁₀ of previously expected tolerances, so that it is near the net shape of the finished roller product thereby greatly reducing the amount of machining required to reach specified dimensions and rolling surface finish quality. Since the radiused corners are precisely formed to net shape (i.e. as ultimately used) or near net shape, the machining requirement in these areas is non-existent or minimal.

In the disclosed process, the tooling is arranged to exclude the material that forms the original sheared end faces from the radiused corners. The absence of this material from such corners is of great advantage because faults and irregularities ordinarily produced in the shearing process cannot exist in the radiused corners. Such faults and irregularities in the radiused corners of prior art rollers are known to initiate cracks and premature bearing failure when used in bearing assemblies. Still further, the disclosed roller blank avoids flash between a plane of separation between the tool and die cavity elements. Prior art processes and tooling frequently resulted in a flash ring being created on the periphery of the roller blank where the tool and die elements separate. This ring of flash required extra machining steps and resulted in discontinuous grain patterns at the finished rolling surface. Prior art bearing rollers are subject to premature failure adjacent the site of the flash created grain pattern discontinuity.

From the foregoing, it will be understood that the roller blank, because of its improved grain structure and accurate shape, is capable of reducing costs of anti-friction bearing manufacture and increasing bearing performance in service life.

Figure 7:
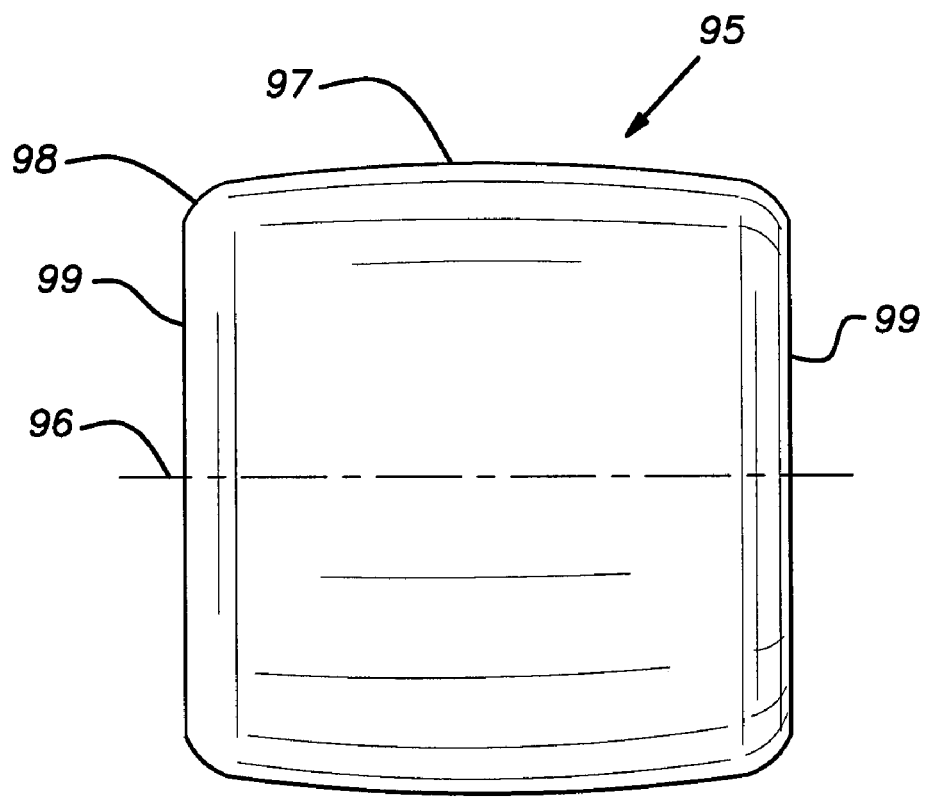
FIG. 7 is a side view of a finished roller made from the roller blank of FIGS. 1 and 2.

A finished anti-friction metal roller 95 for an anti-friction bearing assembly, shown in FIG. 7, is made by machining the blank 10, ordinarily after heat treatment by grinding a limited amount of material (e.g. 0.07 mm) from its annular main surface 102 and, optionally, from its end surface 103. Suitable grinding equipment and techniques are well known in the industry. The axis of rotation of the roller is shown at 96; the ends 99 of the roller are in planes or substantially in planes perpendicular to the axis 96, and a rolling surface 97 is concentrically disposed about the axis 96. The grain structure pattern of the roller metal forming the rolling surface 97, and the radiused corner surfaces 98 is parallel to such surfaces, being the result of grinding a small amount of material from the main side 102 of the blank 10. By way of example, one commercial barrel-type roller blank made in accordance with the above description has a nominal major outside diameter of about 18 mm, a nominal length of about 17.5 mm and the radiused corner has a nominal radius of 2.04 mm. In another commercial example, a barrel-type roller blank has a nominal major diameter of 12 mm, a nominal length of 10 mm and the radiused corners have a nominal radius of 1.4 mm. Blanks of these two examples can be ground on the main surface to remote about 0.07 mm of material, for example, to form the peripheral rolling surface 97 and obtain acceptable commercial size and finish requirements. The end faces 99 of the finished roller can typically be left in their cold formed condition without machining, or can be ground as desired.

In various roller designs, the surface of the radiused corners, both in the cold formed state and in the finished or ground state of the roller, frequently is not tangent to the peripheral main formed surface or the peripheral finished rolling surface and/or is not tangent to a radial plane at its respective end face. For example, a radiused corner surface can intersect the peripheral formed main surface or the peripheral finished rolling surface, and/or a radial end surface at various different angles of, for example, 10, 20 or more degrees. An end surface, as originally cold formed, can be symmetrically indented around the roller axis and can be ground.

Ideally, when practicing the invention substantially all of the formed radiused corner surfaces will be devoid of material from the original sheared end face of the starting blank and the grain pattern immediately underlying this radiused corner surface will be parallel to such surface. The cold forming of the radiused corner surfaces of a blank to a precise shape and without material from the original irregular sheared end face of a starting blank in accordance with the invention enables the blank to be machined into a finished bearing roller ordinarily without the need to machine the radiused corners.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. As used herein, the term tooling and, alternatively, tools includes, separately and collectively, the tool and die inserts, the tool and die cases, and the floating die rings and inserts. In some applications, it may be desirable to integrate the tool cases and the inserts.

What is claimed is:

1. A set of tooling for a cold-forming machine comprising a die case arranged to be fixed on a die breast of the machine, the case being arranged to present a die cavity on a working axis in opposed relation to a tool on a slide reciprocal towards and away from the die breast, and a floating die ring arranged to be supported on the case for limited movement relative to the die case and die cavity along the direction of slide movement independent of direct correspondence with movement of the tool while radially confining a mid-section of a blank such that friction between the mid-section of the blank is eliminated as a retarding force.

2. A set of tooling according to claim 1, wherein the case has a cylindrical portion with an axis aligned with the direction of slide movement when it is mounted in the cold-forming machine, said floating die ring having a part telescoped on said cylindrical portion to support said ring for movement in the direction of slide movement.

3. A set of tooling according to claim 1, including a second die case for mounting on the die breast, and a second floating die ring arranged to be supported on the second die case for limited movement relative to the second die case along the direction of slide movement, the second floating die ring being arranged to receive a blank formed at the first die case and first floating die ring.

4. A set of tooling according to claim 1, for forming roller blanks for use in an anti-friction bearings, comprising a pair of circular tool and die cavities each having a major diameter and designed to simultaneously cold-form the ends of a blank of circular cross-section, the die ring having a circular through bore, the circular tool and die cavities having respective configurations to form the ends of a sheared blank with radiused corners that have radii that are small in comparison to the diameter of the blank, the through bore being at least as large as a major diameter of the tool and die cavities.

5. A set of tools for forming roller blanks for use in an anti-friction bearings, comprising a pair of circular tool and die cavities each having a major diameter and designed to simultaneously cold-form the ends of a blank of circular cross-section, and a separate die ring having a circular through bore for constraining a mid-section of the blank, the die ring being arranged to move towards the die cavity independently of direct correspondence with movement of the tool cavity such that friction between the mid-section is effectively eliminated as a retarding force, the tool and die cavities having respective configurations to form the ends of a sheared blank with radiused corners that have radii that are small in comparison to the diameter of the blank, the through bore being at least as large as a major diameter of the tool and die cavities.

6. A set of tooling for a cold-forming machine comprising a die case arranged to be fixed on a die breast of the machine, the case being arranged to present a die cavity on a working axis in opposed relation to a tool on a slide reciprocal towards and away from the die breast, and a floating die ring arranged to be supported on the case for limited movement relative to the die case and die cavity along the direction of slide movement while radially confining a mid-section of a blank, the die cavity being paired with a tool cavity for simultaneously forming the ends of a blank with radiused corners, the floating die ring being arranged for shaping the blank by circumferentially constraining its mid-section while being driven towards the die cavity by friction between the floating die ring and the blank independently of direct correspondence with movement of the tool cavity such that friction between the mid-section of the blank is effectively eliminated as a retarding force which would otherwise operate to diminish the filling of the radiused corners of the die cavity with the blank material.

7. A set of tooling for cold-forming metal roller blanks comprising a pair of tool and die cavities for simultaneously forming the ends of a blank with radiused corners and a floating die ring for shaping the blank by circumferentially constraining its mid-section while being driven towards the die cavity by friction between the floating die ring and the blank independently of direct correspondence with movement of the tool cavity such that friction between the mid-section of the blank is effectively eliminated as a retarding force which would otherwise operate to diminish the filling of the radiused corners of the die cavity with the blank material.

8. A set of tooling as set forth in claim 7, wherein the die cavity is in a case and said floating die ring is arranged to be supported by said case for movement towards said die cavity.

9. A set of tooling as set forth in claim 8, wherein said case has a cylindrical portion with its axis aligned with the direction of slide movement and said floating die ring has a skirt telescoped over the cylindrical portion of said case.

10. A set of tooling as set forth in claim 9, wherein said die cavity is an insert carried in said case.

11. A set of tooling as set forth in claim 7, including a second pair of tool and die cavities and a floating die ring for said second die cavity, said second pair of tool and die cavities being arranged to shape the ends of a blank received from said first tool and die cavities and the first floating die ring.

12. A set of tooling as set forth in claim 11, wherein said first floating die ring is sized to form the mid-section of the blank to produce a slip fit in the second floating die ring.

13. A set of tooling as set forth in claim 11, including a third pair of tool and die cavities configured to finish shape a blank received from the second pair of tool and die cavities.

14. A set of tooling as set forth in claim 13, including a guide, separate from said slide, to closely align said third pair of cavities.

15. A set of tooling as set forth in claim 13, wherein said pairs of tool and die cavities have associated passages for circulating coolant to maintain said tool cavities at a predetermined temperature range.

* * * * *